Nov. 30, 1965         R. R. WALTON                3,220,056
                TREATMENT OF SHEET MATERIALS
Filed Nov. 27, 1959                          9 Sheets-Sheet 3
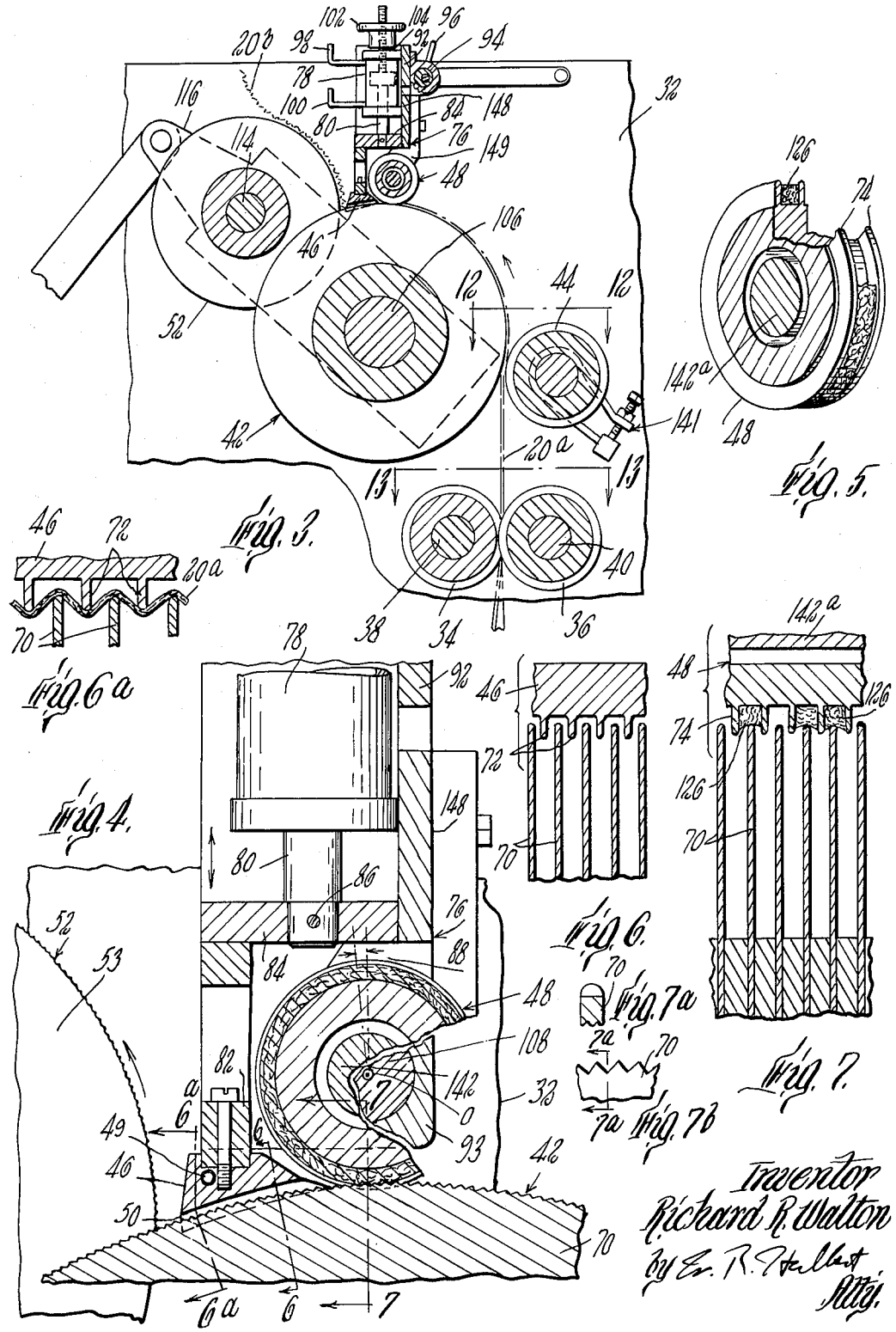

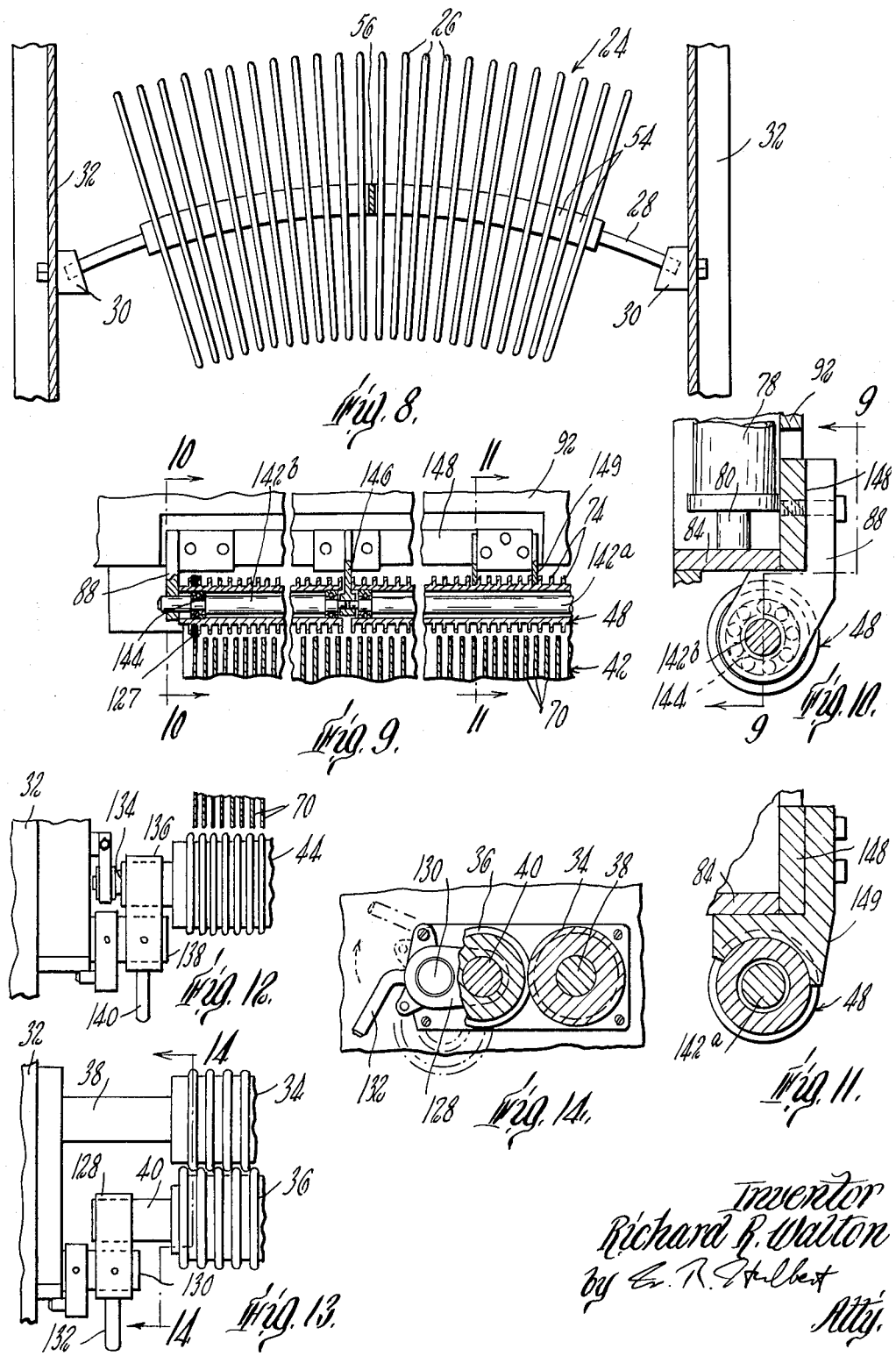

Inventor
Richard R. Walton

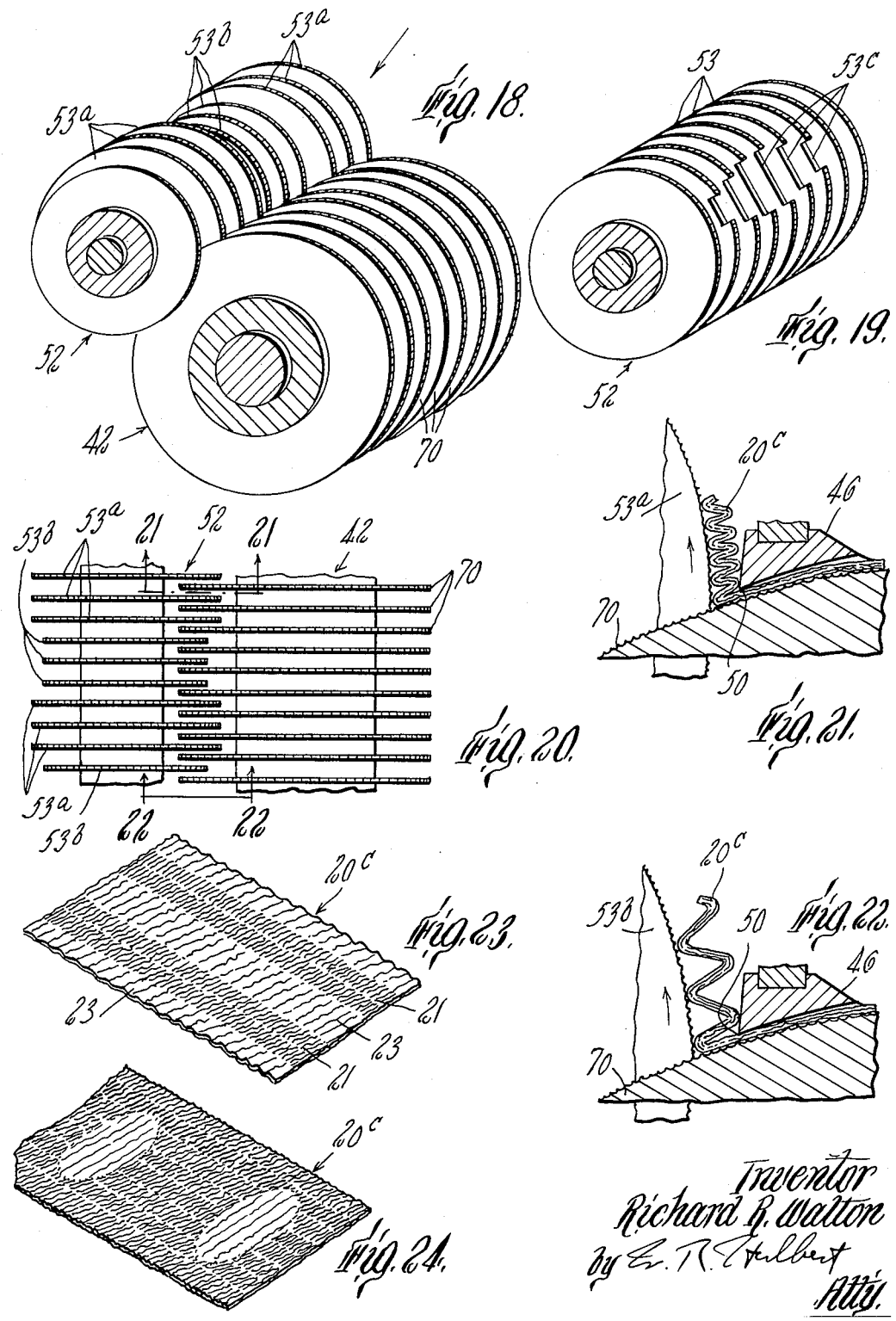

Nov. 30, 1965  R. R. WALTON  3,220,056
TREATMENT OF SHEET MATERIALS
Filed Nov. 27, 1959  9 Sheets-Sheet 7

Inventor
Richard R. Walton

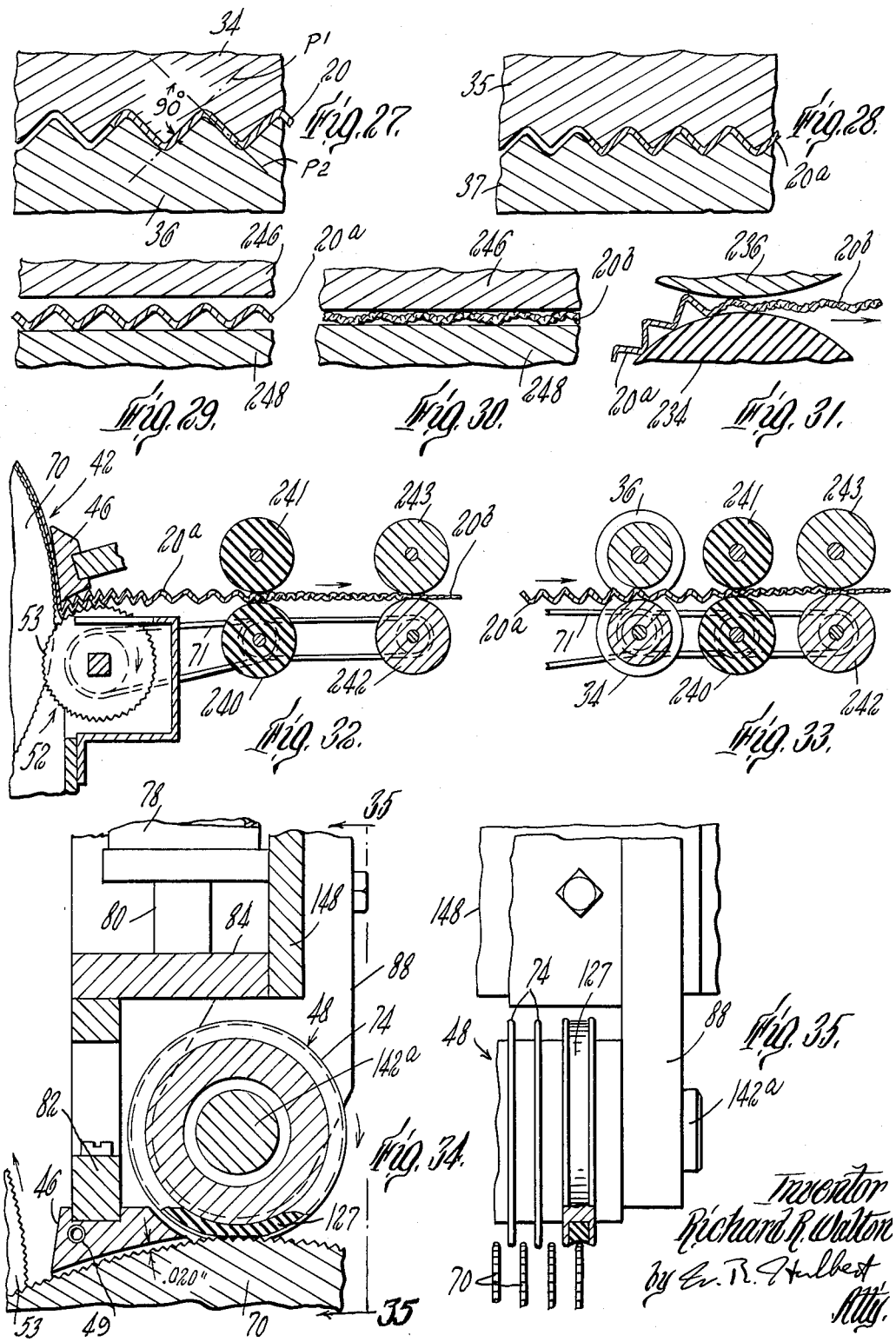

United States Patent Office 3,220,056
Patented Nov. 30, 1965

3,220,056
TREATMENT OF SHEET MATERIALS
Richard R. Walton, 10 W. Hill Place, Boston, Mass.
Filed Nov. 27, 1959, Ser. No. 855,630
16 Claims. (Cl. 18—19)

The invention includes improvements upon the invention disclosed and claimed in my co-pending application Serial No. 658,213, filed May 7, 1957, issuing on December 1, 1959, Patent No. 2,915,109.

This invention relates to the condensing of sheet material and includes the creping of a web of paper or other deformable sheet materials and the compacting together of the fibers or other components of sheet materials in one or both directions and altering the physical characteristics of sheet materials by producing structural rearrangements therein.

For purposes of clarity, the following terminology will be used:

"Condensing" or "condensation" of a web refers generally to the creping, crinkling or pleating thereof and/or compacting together or rearranging of the fibers or other components thereof with or without imparting a noticeable permanent crepe, crinkle or pleat in the final product.

"Longitudinal creping" or "condensing" refers to imparting crepes, pleats, crinkles or corrugations which run lengthwise of the web which is therefore condensed widthwise and includes widthwise compacting together of its fibers or other components with or without imparting a noticeable permanent crepe, crinkle or pleat in the final product.

"Transverse creping" or "condensing" refers to imparting crepes, pleats, crinkles, or corrugations which run widthwise of the web which is therefore condensed lengthwise and includes compacting together of its fibers or other components in the direction of the length of the web with or without imparting a noticeable crepe, crinkle or pleat in the final product.

The term "web" will be used to denote any running length of sheet material, which may be of one or more layers, capable of being processed in accordance with the invention, including, but not by way of limitation, paper, foils, plastics, fibrous bats, and woven and nonwoven fabrics.

Reference may be had to my said copending application for the details of the machine and method upon which the present invention includes improvements. Accordingly, in the present specification, I will summarize only briefly some of the features of my said prior invention.

In accordance with said prior invention, I provide a machine for altering the degree of condensation of a traveling web of sheet material, with or without the formation of visible crepes therein, in either or both directions. The web is first optionally drawn or gathered together widthwise, i.e., longitudinally creped, by passing it approximately 180° (or multiples thereof) from the convex to the concave side of a bent roll (or series of rolls) which may comprise a side-by-side series of rotatable discs or rollers mounted upon a bent axle. Thence the web is preferably drawn through one or more series of intermeshing rollers to form and maintain corrugations in the web and is led onto a main creping roll having alternate circumferential grooves and ribs and carried on the surfaces of said ribs through an arc. The web is pressed by mechanical means, preferably a grooved shoe, at least partially into the grooves of the main roll and is lifted therefrom at a line of discharge by means preferably of a comb, preferably movable, intersecting the roll at a location closely spaced to the pressing means. The peripheral speed of the comb, when rotatable, is different from that of the roll so as to change the degree of compaction or to rearrange the components of the web.

In accordance with the present invention the mechanical means for pressing the web against the main creping roll comprises a combination ribbed shoe and ribbed backup roll assembly intermeshing with the main roll, the web first passing beneath the roll, which preferably is driven at the same peripheral speed as the main roll, and thence beneath the shoe. The roll-shoe assembly is adjustable bodily toward and away from the main creping roll to vary the distance that the ribs of each thereof extend into the grooves of the main roll. Additionally, the assembly is so mounted that it may pivot about the axis of the backup roll, thus permitting the shoe to swing bodily toward and away from such main roll without disturbing previous adjustment of the backup roll.

The improved results achieved by the use of such a combination backup roll and shoe assembly include: better creping action with greatly reduced friction, because most of the work is performed by rolling friction in advance of the shoe; and simple and accurate control of the creping action due to the unique pivotal mounting, permitting independent adjustment of the shoe without interference with previous adjustment of the backup roll, whereby the machine may be successfully run even on delicate webs by an unskilled operator.

Additionally, in accordance with the invention, there may be mounted in at least some of the grooves of the backup roll resilient rings adapted, when the backup roll is adjusted toward the ribs of the creping roll, directly to press the web against the frictional web-gripping peripheries of the same, so that the web will be more firmly gripped thereby to be drawn forward beneath the shoe. This feature permits successful processing of even weak, slippery sheets, such as waxed paper, without injuring or cutting thereof, while reducing friction for any type of web.

Further, in accordance with the present invention, I optionally provide means for finely adjusting the spacing of the shoe and backup roll from the main creping roll at spaced locations along the width of the machine so as to permit compensation for flexing of the rolls or shoe so that, especially on wide machines, the performance of the machine will not be impaired by any such flexing and uniform creping will be achieved. The shoe and roll assembly, furthermore, is preferably resiliently urged downwardly so as to yield to pass splices in the web or automatically to adjust itself to thicker webs without injury or cutting.

Where a two-way creping operation is performed by the machine, in accordance with the present invention, I mount the curved roll about which the web is passed before entering the transverse creping unit in such a way that the curved roll may be swung or pivoted about an axis defined by its two ends, not only to compensate for running webs of different widths, but also to adjust the longitudinal creping effect in cases where the web may have different moisture contents (or otherwise different physical characteristics) nearer its lateral edges than at its center. The web after departure from this curved roll is in a condition such that various shapes and sizes and frequencies of lengthwise or diagonal corrugations or pleats can readily be formed therein.

Further, in accordance with the invention, I may optionally use a takeoff roll or rotatable comb having different surface characteristics or contours at different locations thereon, thus to impart a contoured or varied creping effect to or to impose a recurring pattern upon the creped web.

In certain cases the invention is adaptable to produce a fine almost invisibly creped stretchy product by passing the web after one-way or two-way creping through a nip between rolling curved surfaces. If the amplitude, frequency and angle of the corrugations formed in the web are such, having regard to the thickness, stiffness and other physical characteristics of the material being processed, that they will pass into the nip between the surfaces without either being smoothed out or folded over into pleats, they will be crushed by said surfaces to a fine series of almost invisible crepes. In accordance with this aspect of the invention, I first crepe or corrugate the web in a manner such that the planes of the corrugations intersect each other preferably at angles of approximately 90°, i.e., 45° to the plane of the web being treated. Next I crush these corrugations flat between opposed smooth surfaces. I have discovered that if this be done under certain conditions, depending upon the thickness, rigidity, and other characteristics of the web, each corrugation will be broken down into a regular series of extremely fine crepes or crinkles, the degree of fineness being related, to some extent at least, to the frequency per unit of length of the original corrugations. The dimension of each corrugation from valley to peak must be sufficiently short so that it will crush together without pleating.

Still further objects, features and advantages of the invention will become apparent from the following detailed description of a presently preferred embodiment thereof taken in conjunction with the accompanying drawings in which like numerals refer to like parts in the several views and in which:

FIG. 3 is a vertical sectional view on an enlarged scale of the transverse creping unit of the machine taken on line 3—3 of FIG. 2;

FIG. 4 is a still further enlarged sectional view with parts broken away of a portion of the transverse creping unit of the machine as shown in FIG. 3;

FIG. 5 is a fragmentary view on an enlarged scale in perspective, with portions broken away, of one section of the backup roll of the transverse creping unit, showing a resilient ring mounted in a groove thereof;

FIG. 6 is a fragmentary vertical cross-sectional view (creped sheet omitted) taken on the line 6—6 of FIG. 4 showing the relationship between the grooves of the pressing shoe and the ribs of the main creping roll;

FIG. 6a is a view (creped sheet included) similar to FIG. 6 taken on line 6a—6a of FIG. 4;

FIG. 7 is a similar vertical sectional view (creped sheet again omitted) through the backup roll taken on line 7—7 of FIG. 4;

FIGS. 7a and 7b are fragmentary much enlarged views, one being a section of the other as indicated, of a portion of the periphery of one of the discs of the main transverse creping roll showing the shape of the special knurl used thereon;

FIG. 8 is a plan view on the same scale as FIGS. 1 and 2 of the curved longitudinal creping roll taken on line 8—8 of FIG. 2;

FIG. 9 is a view partly in vertical section and with portions broken away on a reduced scale taken on line 9—9 of FIG. 10 showing the mounting of the backup roll of the transverse creping unit;

FIG. 10 is an end view on an enlarged scale of the mechanism shown in FIG. 9 taken on line 10—10 of FIG. 9;

FIG. 11 is a sectional view similar to FIG. 10 taken on line 11—11 of FIG. 9;

FIG. 12 is a fragmentary horizontal sectional view taken on line 12—12 of FIG. 3 showing the operation of the guide roll beneath which the web passes onto the main transverse creping roll;

FIG. 13 is a similar horizontal sectional view taken on line 13—13 of FIG. 3 showing the operation of the pair of refining rolls located immediately prior to the line at which the web is led onto the main transverse creping roll;

FIG. 14 is a sectional view taken on line 14—14 of FIG. 13;

Figure 2:
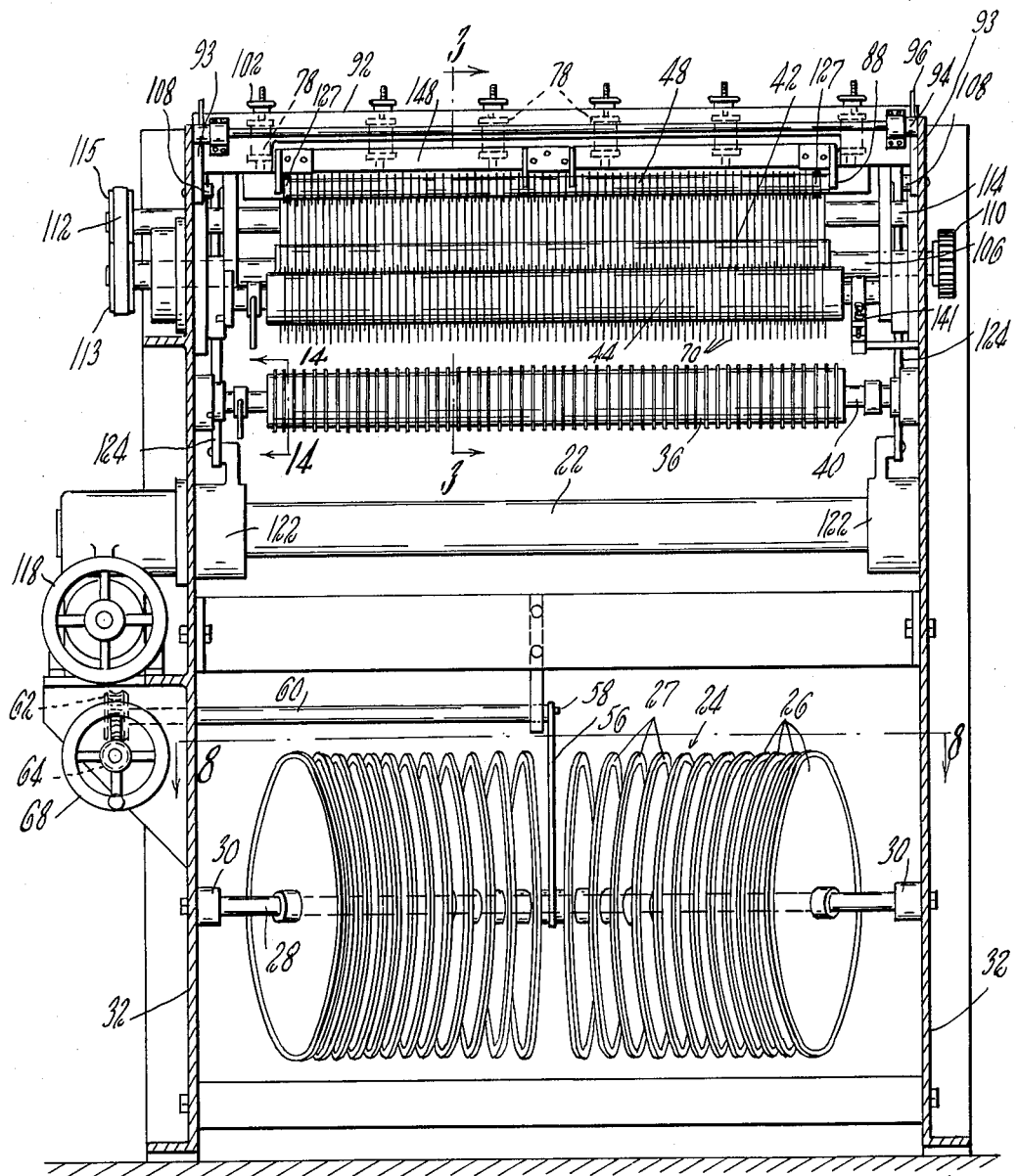
FIG. 2 is a rear elevation partly in section of the machine taken on line 2—2 of FIG. 1.
Figure 15:
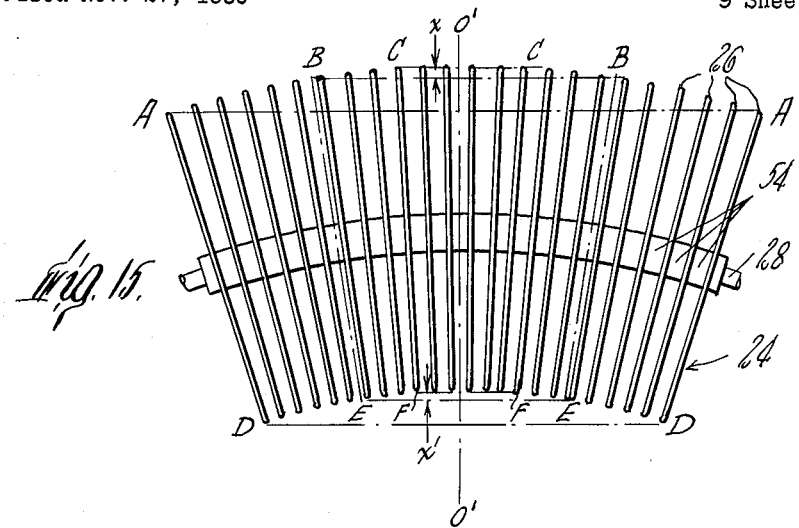
Figures 16, 17:
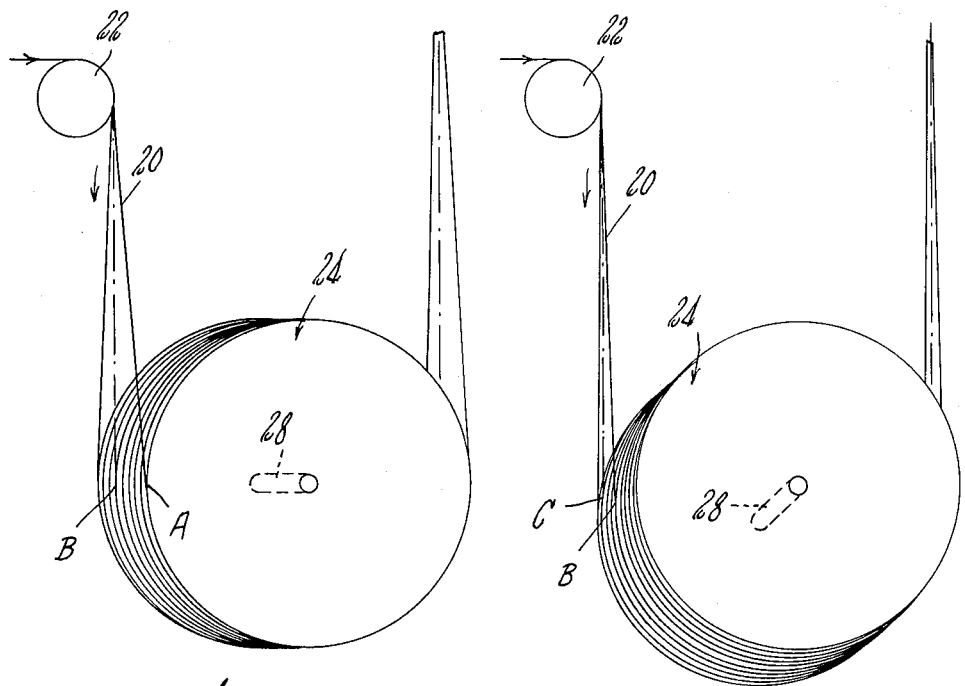
Figure 25:
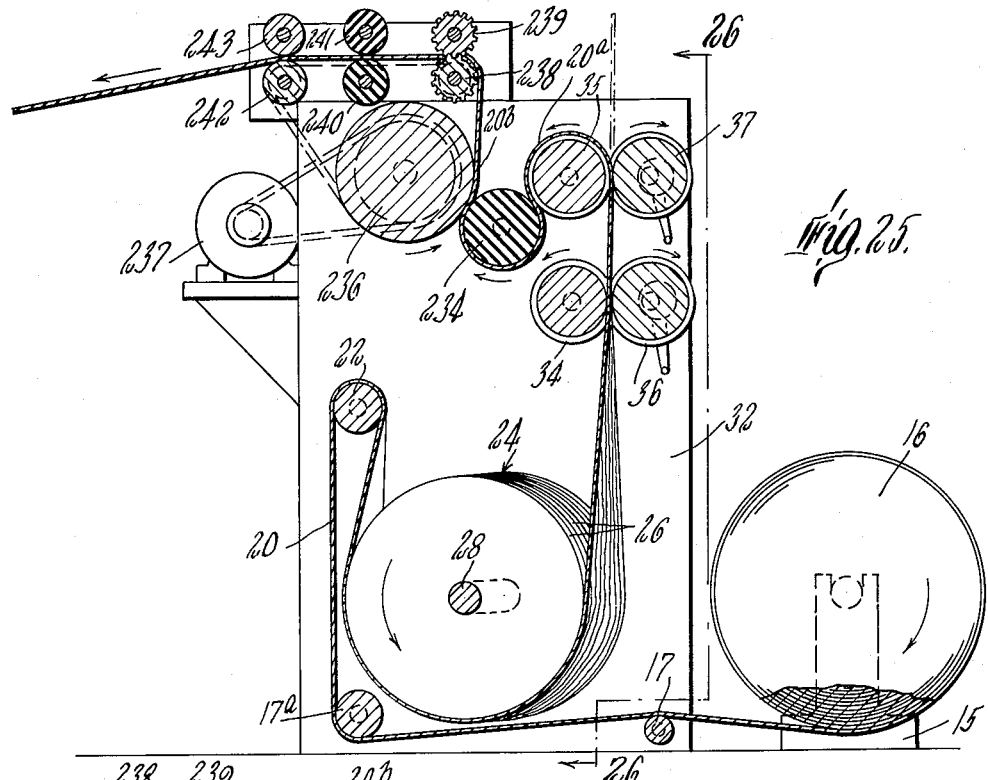
Figure 26:
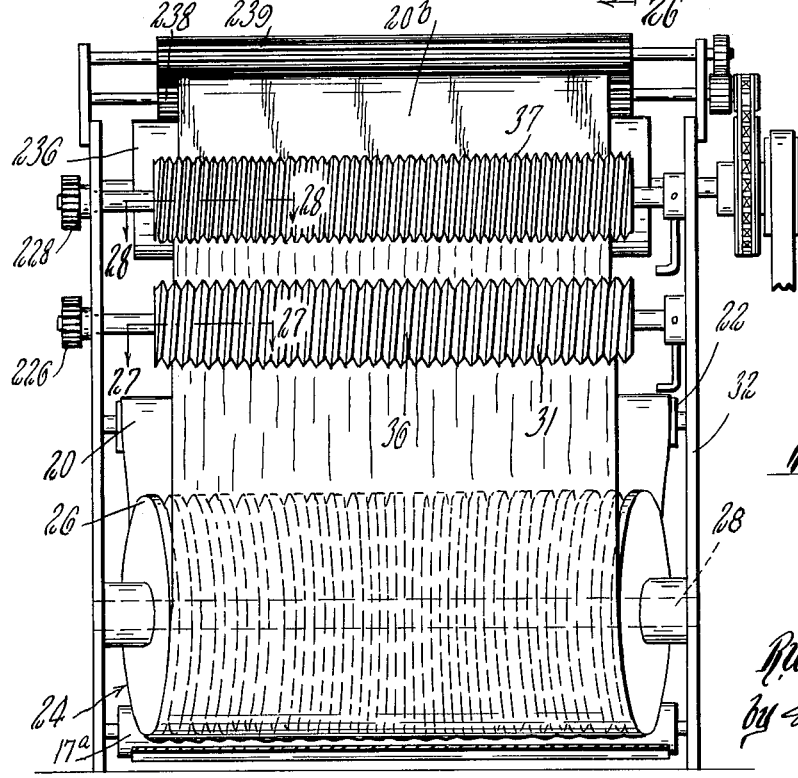
Figure 36:
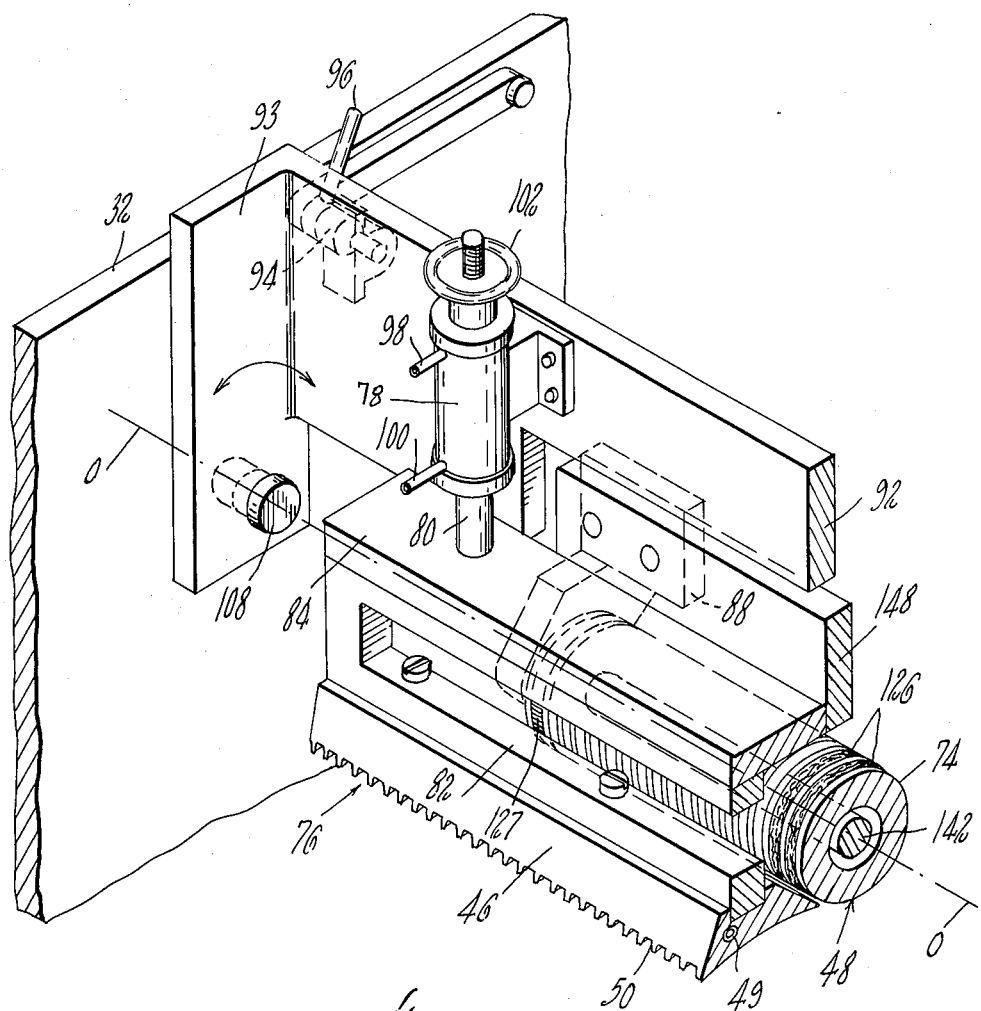

FIGS. 15, 16, and 17 are diagrammatic representations showing the principle of operation of the adjustable curved roller shown in plan view in FIG. 8;

FIG. 18 is a view in perspective of portions of the main transverse creping roll and intermeshing takeoff roll of the novel machine showing a modification of the latter roll for producing contoured special transverse creping effects;

FIG. 19 is a similar view of a still further modified form of takeoff roll;

FIG. 20 is a plan view of portions of the rolls shown in FIG. 18;

FIG. 21 is a fragmentary sectional view taken on line 21—21 of FIG. 20;

FIG. 22 is a view similar to FIG. 21 taken on line 22—22 of FIG. 20;

FIG. 23 is a perspective view of a piece of creped paper made using the arrangement shown in FIGS. 18 and 20;

FIG. 24 is a similar view of another piece of creped paper resulting from operation of the takeoff roll shown in FIG. 19;

FIG. 25 is a vertical sectional view of a modified machine for fine two-way creping;

FIG. 26 is a rear elevation taken on line 26—26 of FIG. 25;

FIG. 27 is a fragmentary sectional view on an enlarged scale taken on line 27—27 of FIG. 26;

FIG. 28 is a view similar to FIG. 27 taken on line 28—28 of FIG. 26;

FIGS. 29 and 30 are diagrammatic representations illustrating the principle of operation employed in converting the corrugated material shown in FIG. 28 to its very fine crepe form of FIG. 30;

FIG. 31 is a fragmentary sectional view showing the mode of operation of the final pair of squeeze rolls of the embodiment of FIGS. 25 and 26;

FIG. 32 is a longitudinal sectional view on a reduced scale of a portion of a machine according to the invention illustrating how the corrugated product may be taken directly from the machine and processed in accordance with the fine creping feature of the invention;

FIG. 33 is a similar view of a portion of a machine in accordance with FIG. 32 adapted for two-way crepe processsing in accordance with the invention;

FIG. 34 is a fragmentary enlarged vertical sectional view taken on line 34—34 of FIG. 2 illustrating an optional means for driving the backup roll of the transverse creping unit;

FIG. 35 is a sectional view of the same mechanism taken on line 35—35 of FIG. 34; and FIG. 36 is an isometric view on an enlarged scale of an end portion of the shoe-drive roll assembly illustrating the special adjustable mounting of the same.

*General arrangement*

Figure 1:
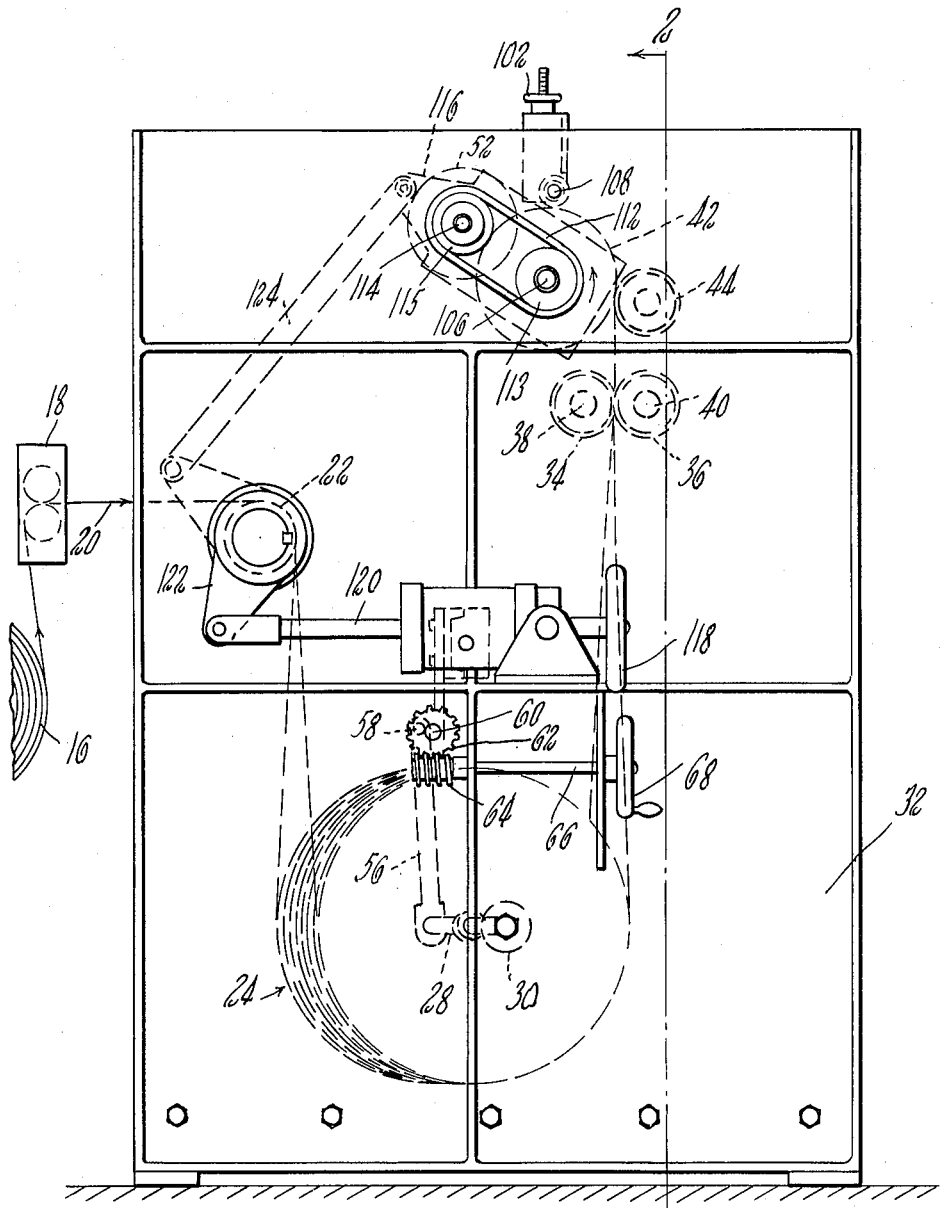
FIG. 1 is a side elevation of one form of the machine showing the general arrangement of the parts.

The general relationship of the parts of my improved machine is best seen in FIGS. 1 and 2. A web 20, which may be of paper, foil, fabric, or any other sheet material or laminates thereof which may be processed on the machine, is led from one or more stock rolls 16 through a braking or tensioning device 18 horizontally about a smooth bar or roll 22 through an angle downwardly onto the convex side of a curved roll 24 which comprises (FIGS. 2 and 8) a series of side-by-side discs 26 rotatably mounted on a curved axle 28 held in mountings 30 for limited swinging or pivoting movement as hereinafter described. The mountings 30 are in turn secured to suitably reinforced side rails or plates 32 on which the various components of the machine are mounted.

The web 20 is led about the curved roll 24 from the convex to the concave side thereof, through a total angle of approximately 180° (as more particularly hereinafter described), so that, in the embodiment shown in these views it passes onto the roll 24 vertically downwardly and is led off the roll vertically upwardly (FIGS. 1, 16 and 17) and passes between a pair of intermeshing grooved refining rolls 34, 36 mounted rotatably on shafts 38, 40. The grooves of these rolls are mutually spaced so as to impart the desired number and depth of longitudinal corrugations in the web.

After passing between the rolls 34, 36, the web enters the transverse creping unit wherein it passes between the main creping roll 42 and guide roll 44 which has ribs and grooves intermeshing the grooves of the main creping roll 42.

Referring particularly to FIGS. 3, 4 and 36, which illustrate this transverse creping portion of the machine on an enlarged scale, it will be seen that the web 20a (as I will refer to it after it has received its longitudinal corrugations by passage through the longitudinal creping unit comprising the curved roll 24 and the refining rolls 34 and 36), passes around the periphery of the main creping roll 42 in this instance through an angle of slightly more than 90°. During its travel about the roll 42, it is pressed thereagainst by mechanical pressing means comprising a back-up roll 48 followed by a grooved shoe 46, the ribs of both of which press the web into the grooves of the main creping roll 42 in such a way that the corrugations imparted by the action of the rolls 34, 36 and the leadon roll 44 are maintained. The web is strengthened at this point by the thus formed flutes or corrugations. Beyond the trailing edge 50 of the shoe 46 the web encounters the peripheries of the discs comprising the rotatable takeoff roll or comb 52, against which the web impinges. The peripheral speeds of the takeoff roll 52 and the main creping roll 42 are different so that the degree of condensation of the web in the direction of its length will be altered as desired. Ordinarily, the peripheral speed of the takeoff roll 52 will be less than that of the main creping roll 42, and a transverse creping or compacting action will occur. The fineness of transverse crepe depends generally on the spacing between the takeoff roll 52 and the trailing edge 50 of the shoe 46. For some purposes the roll 52 is not driven, the web being pulled thereover thus reducing degradation of the sheet material.

By varying the contour of the takeoff roll 52 as illustrated in FIGS. 18–22, special creped effects may be achieved as shown in FIGS. 23 and 24.

A further feature of the invention is shown in FIGS. 25–31 wherein the transverse creping unit of the previous embodiments is replaced or supplemented by a different form, including a plurality of refining rolls, for producing a product characterized by an almost invisible crepe. In this form of the invention the web is, after travel about the main curved roll 24, passed between one or more pairs of refining rolls to set the longitudinal corrugations therein, then calendered, and thereafter transversely creped by using intermeshing fluted rolls, again followed by smooth calendering rolls.

A still further modification of the invention is shown in FIGS. 32 and 33 wherein the transversely creped product, after emerging from the transverse creping unit of the embodiment of FIGS. 1–24, is provided with a virtually invisible crepe in the manner just mentioned.

Having thus explained in general terms the overall mode of operation of my improved machine, I will now advert to some of the details of the construction thereof as it relates more especially to the novel features of the present invention.

*The longitudinal creping unit*

FIGS. 15–17 illustrate diagrammatically the principle of operation of the curved roll 24 about which the web 20 is passed for longitudinal creping. This curved roll is the principal element of the longitudinal creping unit. As already indicated, the roll consists of a series of side-by-side discs or rollers 26 free to rotate on a curved axle 28 and separated from each other by spacing elements 54. In this instance, the axle 28 is bent into the arc of a circle. If the web is of sufficient width so that it extends throughout the arc subtended by the chord A—A on the input side, it will be seen that after being drawn 180° around the roll 24, it will be gathered together to a width comprising, in the absence of slippage, an arc of smaller radius subtended by the chord D—D. Here the chord B—B intersects the arc defined by the chord A—A with each point marked B located half the arcuate distance between a point A and the point where center axis O' intersects the roll as shown in FIG. 15. The mean paths of the web being led onto and off the roll 24 correspond with the positions of the chords B—B and E—E.

Now, if in place of the web of the original width A—A, there be substituted a web of initial width B—B, this latter web will be gathered widthwise by passage about the roll 24 so that its width at discharge, absent slippage, is defined by chord E—E. Under such conditions, it will be observed that the lines referred to in the preceding paragraph have shifted on the input side from B—B to C—C by a distance $x$, whereas the corresponding lines at the discharge side have shifted the distance $x'$ between the chords E—E and F—F. The mutual relationship between the two runs of web will thereby have been altered and uniform longitudinal creping may be disturbed.

Accordingly, in accordance with the invention, I have found that minor adjustment of the roll 24, as indicated in FIGS. 16 and 17, will serve to reestablish the desired relationship between the two runs of web. The swinging of the roll 24 is accomplished by the mechanism illustrated in FIGS. 1 and 2. The bent axle 28 is pivotally held in the mountings 30. A vertical arm 56 has an opening in its lower end through which the axle 28 passes. The upper end of the arm 56 is pivotally held on an eccentric projection 58 of a horizontal shaft 60 which extends out through the side 32 of the machine. The shaft 60 in turn carries a gear 62 operated by a worm 64 on a shaft 66 rotated by means of a hand wheel 68. It is manifest that operation of the hand wheel 68 causes rotation in one direction or other of the shaft 60, in turn raising or lowering the center point of the curved axle 28 so as to shift it between the positions shown in FIGS. 16 and 17 in order to accommodate, within limits, webs of different widths or different characteristics.

I have found that the swinging adjustment of the roll 24 is important not only to adjust the machine for longitudinal creping of webs of different widths but also to permit successful longitudinal creping of webs whose physical characteristics may, for one reason or another, vary at different locations between their marginal edges. For example, if a web to be longitudinally creped has been wound on a stock roll under humidity conditions so as to have a certain uniform moisture content but has been stored prior to use under different conditions of atmospheric humidity, the portions of web nearest the marginal edges may well be either more or less moist than the portions near the center. Since the flabbiness of the sheet varies with moisture content, there may be thus produced variations in the flabbiness of the sheet across its width, including changes in tensile strength. Bodily pivoting of the curved roll 24, as hereinabove described, will in many cases provide compensation in the longitudinal creping unit for good creping of such nonuniform sheets.

In order to reduce widthwise slippage of the sheet, preferably I provide the discs 26 of the curved roll 24 with frictional web-gripping peripheral surfaces, as for example, rubber rings 27 (FIG. 2).

It will be noted that, depending upon the curvature of the roll 24 and diameter of its discs 26 in processing various widths and types of web, the distances between the guide roll 22 and roll 24 and between the roll 24 and and the first pair of refining rolls 34, 36 must be such as to permit the web to accommodate itself to the gathering action.

The longitudinal creping unit preferably also includes at least one pair of intermeshing rolls 34 and 36, which I term refining rolls, to set and optically subdivide further the corrugations produced in the web by its passage about the curved roller 24.

The transverse creping unit

A feature of the invention resides in improved mechanical pressing means acting on the main transverse creping roll of the transverse creping unit in order to produce the creping action most efficiently and to permit ready adjustment of the machine for successful creping even by an unskilled operator. This feature is best understood by considering FIGS. 3, 4, and 36.

The roll 42 is preferably composed of a series of side-by-side knurled discs 70 with appropriate spacers in between, as shown in my said co-pending application, Serial No. 658,213, Patent No. 2,915,109. The ribs 72 of the shoe 46 are arranged to extend into the grooves between the discs 70 (FIGS. 6 and 6a), as are the ribs 74 of the drive roll 48 (FIG. 7). The shoe 46 and roll 48 are mounted in a special fixed relationship upon the same frame to form an assembly indicated generally by the numeral 76 (FIGS. 3 and 36). A series of pneumatically operated pistons in cylinders 78 of a convenient number, depending upon the overall width of the machine, are mounted on a bar 92 so that their piston rods 80 will raise and lower the shoe 46 and backup roll 48 simultaneously as a single unit. To this end the shoe 46 is bolted to mounting 82 in turn fastened to a horizontal bar 84 to which the rods 80 are connected by pins 86. The bar 84 carries another bar 148 from which depend the mountings 88, 146 and 149 (FIG. 9) for the roll 48. The roll 48 revolves in bearings 144 spacing it from axle 142a which is mounted on members 88 and 146, which in turn are fastened to the bar 148. The bar 92 is held against vertical movement but can be pivoted bodily about the axis O of the roll 48 through the angle indicated by the dash-dot lines in FIG. 4, since the bar 92 is provided at each side of the machine with portions 93 pivoting on studs 108 journaled in plates 32 of the main frame (FIGS. 2, 3, 4 and 36). This pivoting action is controlled by the eccentric 94 (FIG. 3) operated by a hand lever 96. Fluid, preferably a gas, under pressure is supplied to the cylinders 78 through conduits 98 and 100 from any suitable source and through suitable controlling valves (not shown) in a manner clear to those skilled in the art.

Thus while the shoe, backup roll assembly are vertically adjustable in unison (as indicated by the double-ended arrow, FIG. 4), the shoe alone may be adjusted toward and way from the roll 42 pivotally about the axis of the roll 48 independently of and without in any way affecting the position of the latter.

In starting up, after the web has been led onto the roll 42 beneath the roll 44 and thence beneath the drive roll 48 and shoe 46, the cylinders 78 are operated so as to lower both roll 48 and shoe 46 against the web and main creping roll 42. The machine can then be started and, with the shoe tilted away from the roll 42, the operator can by trial, readily determine to what extent the ribs of the roll 48 should press the web between the discs 70 of the main roll 42 for best results dependent upon the characteristics of the material being processed. If the roll 48 is too low, as would be indicated by cutting or unduly weakening the web, it may be raised across the entire width of the machine by the hand wheels 102 which are rotatably received on the upper ends of the piston rods 80. A shoulder 104 on each wheel 102 imposes a lower limit on the downward travel of the corresponding rod 80 and hence imposes a corresponding lower limit on movement of the roll and shoe assembly 76.

I have found it desirable that the roll 48 be adjusted to do the maximum work. This roll is preferably driven (as will hereinafter be described in connection with FIGS. 34 and 35), and consequently the frictional drag imposed by it upon the web is minimized. The rolling friction is obviously much less than the sliding friction exerted by the shoe 46. Accordingly, this roll is first lowered as far as possible without unduly weakening or cutting of the web. Furthermore, the yielding pneumatic pressure exerted by the piston rods of the cylinders 78 is preferably kept at a minimum, consistent with the characteristics of the web being processed, so that the shoe and roll assembly will yield resiliently to pass splices of web without tangling or fouling the machine or cutting the sheet.

Once having adjusted the vertical position of the roll 48 and shoe 46 by means of the wheels 102 to the desired level, the entire shoe-roll assembly is then pivoted forwardly and downwardly about the axis O of the roll 48 by operation of the eccentric 94 by its handle 96. This pivotal movement, as indicated by the dash-dot lines in FIG. 4 and the double-ended arrow in FIG. 36, bodily raises or lowers the shoe 46 and hence controls the degree to which its ribs 72 will press the web into the grooves between the discs 70 of the main roll after it passes from beneath the roll 48.

The takeoff roll or comb 52 of spaced side-by-side knurled discs 53 is mounted on a shaft 114 journaled in pivot arms 116, which are so mounted as to swing about the axis of the shaft 106 of the main roll 42. Thus, the distance between the periphery of the takeoff comb 52 and the trailing edge 50 of the shoe 46 may be readily adjusted by turning the hand wheel 118 (FIG. 1) which causes reciprocating movement of the shaft 120, in turn swinging the keyed lever 122 and causing corresponding reciprocating movement of the link 124 which is pivotally connected to the arm 116.

The main roll 42 and takeoff roll 52 are driven at the desired speed by any suitable arrangement of gears, belts, chains, and/or sprockets. In the present case I have shown one such arrangement, as indicated in FIGS. 1 and 2, wherein the main roll 42 is driven by a gear 110 and the comb 52 is driven in the same direction as but at a lower peripheral speed than the main roll by a belt or chain 112 and sprockets 113 and 115 drive. The arrangement is such that the speed ratios may be varied by using interchangeable sprockets of different diameters.

Since the web is drawn through the machine by the main creping roll 42, it is important to reduce to a minimum frictional resistance to passage of the web created by the shoe 46. Even so unwanted heat may be generated by friction between the traveling web and the shoe 46, possibly warping the parts and spoiling the creping action. Optionally this heat may be dissipated by circulating a coolant through the passage 49 in the shoe.

As already stated, the work which must be performed by the shoe (and corresponding frictional loss) is minimized by taking maximum advantage of the rotatable backup roll 48 (FIGS. 34, 35 and 36). The drive of this roll is accomplished by providing resilient gripping rings 127 in one or more of the endmost grooves of the periphery of the roll 48 at locations beyond the marginal edges of the sheet being processed so that such rings will engage the surfaces of one or more of the discs 70 of the main creping roll thereby to drive the roll 48. Such drive automatically assures that the peripheral speeds of the rolls 42 and 48 be the same and eliminates the necessity for gears, chains, belts, or the like, to accomplish the drive.

It will be observed from considering FIGS. 4, 6, 7, 7a and 7b that the peripheries of the discs 70 have frictional web-gripping surfaces, as by knurling. Each disc also has a smoothly curved profile on the line of intersection of any plane through its axis. Thus, the web, when pressed between the discs 70 by the action of the back-up roll and shoe, may slide quite readily laterally and adjust itself, equalizing local widthwise stresses. Also sharp cutting edges are avoided and more web-gripping surface is thereby provided. On the other hand, the knurls, as indicated in the enlarged view (FIG. 7a) are quite abrupt in the direction of rotation so as to present strong gripping surfaces engaging the web to pull it forward and pass it beneath the shoe 46. The web is molded about these surfaces of the knurls by the action of the roll 48 and shoe 46.

The frequency of knurls on the discs 70 for most purposes should be such as not to interfere with the creping action to be performed by the discs 53 of the takeoff roll 52 at the discharge edge 50 of the shoe 46. In other words, the knurls ordinarily should be of high enough frequency and small enough in magnitude, with regard to the physical characteristics of the sheet being processed, so as not to produce a substantial wavy crepe pattern of its own. I have found that for most sheet materials a frequency of 18–20 per inch is satisfactory. On the other hand, for some purposes, it is desirable to control the frequency of a coarse crepe by employing a frequency corresponding with the pitch of the knurling. For example, for some packaging purposes a uniform high bulk creped paper is desired, such as eight crepes per inch of 30 lb. kraft. This type of transverse crepe is readily produced and controlled by employing a corresponding frequency of knurl of the discs 70.

Where it is desired to enhance the gripping of the web, especially where slippery webs having little tensile strength across the sheet (waxed paper, for example) are being processed, I supplement the action of the ribs of the roll and shoe, just described, by the use of resilient rings 126 mounted in at least some of the grooves between the ribs 74 of the roll 48 (FIGS. 5 and 7). The rings 126 may be of felt, rubber, or other suitable material. Their number, position, and size will depend on the nature of the web. It will be observed that they should not extend so far from the periphery of the roll 48 as accidentally to cause the web to be caught or pinched and carried up between the roll and the shoe or interfere with action of the ribs 74. Their function is to press the web gently into the knurls of the peripheries of the discs 70, thereby greatly enhancing the grip exerted by such peripheries on the web, without impairing the action of the ribs 74.

From the backup roll the web passes immediately beneath the shoe 46 where the ribs 72 (FIGS. 6 and 6a) maintain the corrugations in the grooves between the discs 70 and may press these portions of the web further into the same. The web is then extruded from the discharge edge 50 of the shoe 46 and immediately impinges against the surface of the takeoff comb 52 to be lifted from the roll 70 and transversely creped if the peripheral speed of the roll 52 is lower than that of the roll 42, or stretched if such speed is greater.

I have found that the columnar rigidity imparted to the web by reason of the longitudinal corrugations or flutes formed therein by the interaction of the roll 48 and shoe 46 with the roll 42 gives it sufficient strength to be extruded very forcibly beneath the shoe 46 and without crumpling and to be transversely creped with minimum degradation of the sheet by the action of the takeoff comb 52. This columnar rigidity effect permits use of the creping machine of the invention on delicate or flexible materials as well as materials having little tensile strength in their cross direction, such as waxed paper, to produce creped articles of novel and unique characteristics which have not been successfully achieved by conventional apparatus and methods. It will be noted that in transversely creping sheets having little or no widthwise stretch it may be necessary in order to achieve uniform results first to longitudinally crepe the same by passage about the roll 24. Materials such as Mylar are non-stretchy and must be gathered sufficiently widthwise before transverse creping to permit the formation of longitudinal flutes or corrugations during passage through the transverse creping unit.

*Mechanical details*

Further details of this embodiment of the machine will now be briefly described in connection with FIGS. 8–14. As already explained, the web passes from the convex to the concave side of the curved roller 24. From thence it passes between the intermeshing refining rolls 34 and 36. In FIGS. 13 and 14, the arrangement whereby the rolls 34 and 36 may be sprung apart to permit initial threading of the web is shown. The shaft 38 of the roll 34 is rotatably mounted on the side frame 32 of the machine, whereas the shaft 40 of the roll 36 is held in journals 128 which in turn can be swung about a stub shaft 130 also held on the frame 32 of the machine. The journals 128 may be swung by movement of the handle 132 to spread the rolls 34 and 36 apart for initial threading of the web, as shown in broken lines in FIG. 14.

The guide roll 44 has its shaft 134 similarly held in journals 136, which swing about a stub shaft 138, the swinging movement being accomplished by manipulating the handle 140, thereby to swing the roll 44 out of mesh with the discs 70 of the main creping roll to permit the initial threading operation. Roll 44 is braked by means 141 (FIG. 3) to maintain tension between the guide roll 44 and the shoe assembly 76.

Turning to FIGS. 9–11, the further details of the mounting of the backup roll 48 are disclosed. In order to equalize pressure across the width of the machine to compensate for any flexing of the roll 42, the roll 48 optionally may be composed of a series of end-to-end shafts 142a and 142b rotating in ball bearings 144, the vertical force applied by action of the cylinders 78 being transmitted thereto by the members 88, 146, and 149 connected to member 148 which in turn is connected to the bar 84 (FIG. 10).

*Operation of embodiment of FIGS. 1–24 and 34–36*

In the operation of my novel machine as illustrated in FIGS. 1–24, and 34–36, the web 20 is led from a suitably mounted stock roll 16 suitably tensioned by braking mechanism 18 around the roll 22 vertically downwardly onto the convex side of the roll 24, vertically upwardly from the concave side of said roll, thence between the refining rolls 34, 36 and finally onto the surface of the main creping roll 42 beneath the guide roll 44, which first presses it thereagainst. In the embodiment shown the web passes approximately 90° about the periphery of the main creping roll 42 and thence beneath the backup roll 48 and under the shoe 46. It is pressed into the knurls of the discs 70 of the main creping roll by the combined action of the ribs 74 of the roll 48 and the optional resilient rings 126 held in the grooves between the ribs 74. It then passes beneath the shoe 46, the leading edge of which is placed in the close relationship to the periphery of the ribs 74 of the drive roll 48. The ribs 72 of the shoe 46 maintain or force the web further down into the grooves between the knurled discs 70. The knurled surfaces of the discs 70 now have a very firm grip on the web and extrude it beneath the trailing edge 50 of the shoe 46 where it impinges directly against the traveling knurled surfaces of the discs 53 which comprise the take-off roll 52. Since this takeoff comb for creping purposes revolves with lower peripheral speed than that of the main creping roll 42, transverse creping action occurs and the web is condensed lengthwise.

It is evident that the combined action of the curved roll 24, refining rolls 34, 36, guide roll 44, and the backup roll 48 and shoe 46 serve to form and to set longitudinal corrugations in the web which is therefore longitudinally as well as transversely creped.

Optionally, the curved roll 24 may be dispensed with when substantially only transverse creping is desired. In such case the web may be led directly onto the main creping roll without passage around the curved roll 24 or through the refining rolls 34, 36. It is clear that some longitudinal creping will occur, depending on the stretchiness of the web, even when the machine is operated bypassing the curved roll 24. This is true because stretching of the web to the extent of its elastic limit may be produced periodically across the width of the sheet by the interaction of the grooved backup roll and shoe with the grooved roll 42. This stretching must occur (see FIG. 6a) in cases where the sheet does not compensate for the intermeshing action of the respective ribs by slippage alone. Depending upon their characteristics, some materials so processed without the use of the longitudinal creping roll 24 will have been substantially stretched widthwise while at the same time condensed in the direction of its length whereas others will maintain their width or even be narrowed.

It should be pointed out that the shoe 46 is provided with a tapered leading edge comprising surfaces of the ribs 72 extending in as close as possible relationship to the ribs of the roll 48. In practice I have found that the shoe 46 may be mounted so that the leading edge of the ribs 72 is in actual contact with the ribs 74 of the roll 48. After a brief period of operation the ribs will be worn down slightly and the frictional contact will be lost, and this close relationship nevertheless maintained.

Also I have found it desirable for optimum operation that the leading edge of the shoe 46 may be arranged so that the leading lower edges of the ribs 72 are as close to the peripheries of the discs 70 as possible without causing clogging of the web. For ordinary kraft paper I have found that this adjustment may be of the order of .002 inch (FIG. 4).

The contour of the bottom surface of the shoe 46 should preferably approximate the arc of a circle of the same radius as that of the discs of the main creping roll 70, although this arcuate profile becomes less important in shoes whose fore and aft dimension is relatively small as compared with the circumference of the discs 70.

As already stated, the arrangement by which the vertical adjustment of the backup roll-shoe assembly 76 may first be made, and then the shoe swung independently of and about the axis of the roll 48 permits the machine to be adjusted for operation on a wide variety of different kinds of webs even by unskilled operators. It is only necessary to thread the web, lower the roll and shoe assembly by means of the pneumatic cylinders 78, start up the machine, and adjust the clearance of the roll 48 by means of the hand rolls 142, so that the web is corrugated longitudinally without cutting or injury, and then to swing the shoe ribs downwardly against the web by means of the lever 96 until a point again is reached where cutting or injury to the web just does not occur. Then the takeoff comb 52 may be swung toward the shoe 46 until the desired fineness of transverse creping occurs.

Contoured effects

In FIGS. 18–24 I have shown a modification of the takeoff roll or comb 52 for producing special effects in the creped product processed on the novel machine of the invention.

Referring first to FIGS. 18, 20, 21, and 22, a modified takeoff roll 52 is shown intermeshing with the main roll 42. The roll 52 comprises a series of discs, some of which 53a are of larger diameter than others, 53b. In this instance I have shown alternating series of three each. As is apparent from a consideration of FIGS. 20, 21, and 22, the larger diameter discs 53a extend closer to the trailing edge 50 of the shoe 46 than do the discs 53b, thus producing a finer crepe effect, as indicated in FIG. 21. On the other hand, the smaller discs 53b are located further from the trailing edge 50 of the shoe 46 and produce a coarser crepe effect, as shown in FIG. 22. The overall pattern of creping is illustrated in the piece of creped paper 20c shown in FIG. 23, wherein it will be seen that there are alternating rows 21 of fine crepe and 23 of coarse crepe.

A still further modification of the form of takeoff comb is illustrated in FIG. 19 wherein some of the discs 53 are contoured or cut out as shown by numeral 53c so that a periodic effect of coarser crepe is produced in the creped product as shown in FIG. 24.

Those skilled in the art will appreciate that a wide variety of different effects may be obtained by varying the contour of the takeoff roll 52. Therefore, it will be understood that the two embodiments illustrated in FIGS. 18–22 are for purposes of illustration only. Clearly the creped product 22c may be creped transversely with a wide variety of different ornamental and/or functional effects by appropriate modifications of the discs of the takeoff comb 52. Merely by way of example, I would point out that it is possible to contour the takeoff roll in such a way as to impress at periodic intervals the manufacturer's trademark, initials, or other symbol on his creped product.

Fine creping feature

The embodiment of FIGS. 25 and 26, for fine almost invisible creping, will first be briefly described. The various components of a machine in accordance with this feature of the invention may be mounted on a main supporting frame 32. A stock roll 16 of paper or other sheet material to be creped may be mounted on an auxiliary pedestal 15. The sheet material 20, prior to being processed, is fed into the machine over a guide roll 17 and around two additional guide rolls 17a and 22 onto the convex side of a curved roll, indicated generally by the numeral 24 of a side-by-side series of rotatable discs or elements 26, as in the previous embodiment.

Mounted above the concave side of the curved roll 24 are one or more pairs of intermeshing circumferentially grooved refining rolls 34, 36 and 35, 37. The arrangement is such that the web 20 may be passed about the roll 24 from the convex to the concave side thereof and then directly into the nip between the intermeshing rolls 34, 36 and next between the intermeshing rolls 35, 37 having twice the frequency of ribs and grooves. The thus longitudinally corrugated web 20a travels somewhat more than 180° around the roll 35 and then passes into the nip between the surface thereof and the periphery of a resilient roll 234, of rubber or other suitable material. The latter also engages the surface of the drive roll 236, and the corrugated web is crushed to its fine crepe by passage through this latter nip. The roll 236 may be belt-driven from a motor 237.

It will be noted that the peripheries of the circumferentially grooved rolls 34, 36 and 35, 37 are cut in such a way that they lie in planes P1 and P2 (FIG. 27) which, as shown, intersect each other at an angle of approximately 90°. The planes of the corresponding surfaces of rolls 35 and 37, having twice the frequency, are similarly angled. Thus, when the web 20b emerges from between the rolls 35 and 37, it is longitudinally corrugated, the surfaces of the corrugations lying in planes which intersect each other at angles of approximately 90° and which are arranged at approximately 45° to the plane of the sheet itself.

The principle of operation is illustrated in FIGS. 29 and 30. If a corrugated sheet having the requisite dimension between peak and valley of each corrugation is crushed between flat surfaces, the corrugations will compress into minute crepes or crinkles rather than being smoothed out completely, or folded over into overlapping pleats. This will occur if the dimension from peak to valley of each corrugation is sufficiently short to provide the needed columnar rigidity. This distance will, of course, vary depending on the characteristics of the web. Preferably the angle of corrugation from the plane of the web should be 45°. In FIGS. 29 and 30 a sheet 20a, corrugated in accordance with this principle, is shown disposed between a pair of flat plates 246 and 248. If these plates are squeezed together, the specially corrugated sheet will assume the finely divided creped condition shown in FIG. 30. In accordance with the invention, I adapt this principle to squeeze rolls in a manner shown in FIG. 31, crushing the web between the rolls 234 and 236 and converting the corrugations into the fine crepes shown in the web at 20b.

From what has been said, it will be observed that in the embodiment of FIGS. 25 and 26 the web 20 to be creped is first gathered widthwise by passage approximately 180° about the converging discs 26 in such a manner that the stresses and strains are equalized and danger of tearing the material is eliminated. The thus gathered sheet next passes between the first pair of intermeshing rolls 34, 36, whose circumferential ribs are cut at approximately 45° angles to the horizontal so as to impart a crepe thereto in an angled pattern, as indicated in FIG. 27. The corrugations thus formed by the operations of the rolls 34, 36 may be subdivided as many times as desired or feasible, depending on its characteristics, as by subsequent passage between the similarly circumferentially grooved rolls 35, 37 whose alternating circumferential ribs and grooves occur at twice the frequency of those of the preceding pair and are similarly angled. The pairs of rolls 34, 36 and 35, 37 are geared to each other, respectively, by meshing gears 226 and 228. The intermediate roll 234 of resilient material driven by the roll 236, serves the function of drawing the web through preceding elements of the machine, first by pulling on the web itself and second by its frictional engagement with the roll 35, and also the function of crushing the longitudinally running, specially angled corrugations thereof against both rolls 35 and 236 in succession, so that they are crushed and set as indicated in FIG. 31.

I have found that the circumferentially ribbed rolls 34–37 may be most economically as well as accurately manufactured by cutting the grooves in the form of screw threads, the cutting tool being arranged to cut the surfaces at the desired angle, the meshing pairs being threaded in opposite directions. It is, of course, not possible to predetermine the number of grooves per inch or the optimum depth thereof for all materials which may be processed in accordance with this feature of the invention. These factors are within the skill and discretion of the operator for any particular web which is to be creped. For example, it will be self-evident that a very thick and rigid paper cannot be corrugated by an extremely finely divided ribbed roll. In such case the material would merely be indented rather than corrugated, and therefore, no creping would result in the second stage of the machine. As one example of a web which may be processed in accordance with the invention, I have found that a 40 pound sheet of kraft may be very successfully and finely creped, using a frequency of about twenty-four corrugations per inch for the final pair of intermeshing rolls 35, 37 in the embodiments of FIGS. 25 and 26. For a much lighter material, rolls 35, 37 may be used with a much higher frequency of recurring alternating ridges and grooves.

The one-way creped product 20b, as seen in FIG. 31, may be withdrawn from the machine or further creped in the other direction by passing the same through an attachment at the discharge side of the machine, as shown, to produce a two-way creped product. After discharge from the nip between the rolls 234 and 236, the sheet material is fed directly between a pair of intermeshing corrugated rolls 238, 239, whose ribs run lengthwise and whose cross section, as indicated in FIG. 25, is that of intermeshing pinions. These rolls are so arranged as to produce transverse corrugations angled at about 45° to the plane of the web. The action of the rolls 238, 239 imparts widthwise running corrugations to the already longitudinally creped web. These widthwise corrugations are pressed into a fine crepe by passage first between a pair of rubber or other resilient squeeze rolls 240, 241 and next between a pair of smooth steel squeeze rolls 242, 243. The rolls 238–243 inclusive may be belt or chain driven from the shaft of the roll 236.

The creped product, after discharge from between the rolls 242, 243 is characterized by fine crepe running in both directions and a noticeable and desirable two-way stretch.

A further feature of the invention is also illustrated in FIG. 25. An alternate path for the web is shown in broken lines. I have found that a web passed around the curved roll 24 is in such a condition that it may readily be treated to form therein corrugations or pleats of various shapes, sizes and frequencies running either lengthwise or diagonally. The sheet is adapted for continuous processing between refining rolls because of having already been gathered widthwise. If the sets of refining rolls are arranged in a straight-line path from the line of departure of the web from the roll 24, the corrugations and resultant rigidity are maintained therein. As a result, it is possible, for example, to produce a grade of board with corrugations in the machine direction which is more resistant to crushing. The desired corrugations are imparted thereto by one or more pairs of rolls 34, 36 and 35, 37 having the desired contoured surface.

This feature of the invention is also useful in combination with the machine of the embodiment of FIGS. 1–24 in order to impart to the sheet a special, very fine and almost invisible crepe. This process is also applicable to the creping of sheet materials which have previously been corrugated or creped by a prior art method in either or both directions, provided the following conditions are met, namely: (a) the corrugations are regular rather than irregular in pattern; (b) the corrugations lie in planes, or can be caused immediately prior to processing to lie in planes, which are at a desired angle to the plane of the sheet; and (c) the corrugations are sufficiently fine so that when crushed, the special, very fine crepe will result. The fine creping of an already creped product in accordance with the invention is illustrated in FIGS. 32 and 33.

Referring to FIG. 32, there is shown generally the discharge of a creping machine similar to that of FIGS. 1–24. After the web is lifted off the discs 70 by the action of the rotary takeoff comb 52, it is nipped between the special resilient squeeze rolls 240, 241 of the invention followed by a pair of smooth steel squeeze rolls 242, 243. The rolls 240 and 242 may be belt-driven from the roll 52 by means of a belt 71, the speed ratio being such that the peripheral speed of the rolls 240, 241 and 242, 243 with respect to that of the discs 53 is approximately 1.5 to 1.0. Thus the rollers 240, 241 will partly pull out the corrugations imparted to the web by the takeoff roll 52 so that when they enter the nip between the rolls 240, 241, the corrugations will lie in planes at the desired angle to the plane of the web proper.

Optionally, according to this feature of the invention, the takeoff roll 52 may be an idler roll, and the pairs of rolls 240, 241 and 242, 243 be driven by a separate drive. I have found that a good transverse creping action on some sheet materials is obtainable if the takeoff roll 52 merely idles, being rotated only by having the web 20a pulled thereover by the tension created by driving the nipping rolls 240, 241. For this type of operation the belt 71 may be shifted from the shaft of the roll 52 to some external source of power (not shown).

If the web 20a discharged by the roll 52 has been only transversely creped, the final product 20b will then be creped substantially in only one direction. A twoway finely creped product may be produced if the web has been longitudinally and transversely creped in accordance with the previous embodiments. Since the discs 53 ordinarily will be spaced apart a considerable distance for ease of manufacturing, it will be evident that the longitudinally extending corrugations will be quite coarse, indeed too coarse to be processed in accordance with this feature of the present invention. Accordingly, I may employ the same intermeshing circumferentially grooved rolls as employed in the embodiment of FIGS. 25 and 26 in order to subdivide the longitudinally extending corrugations sufficiently and to impart to them the desired angle so that they may be subsequently crushed into the unique, very fine crepe which is characteristic of a product processed in accordance with this feature of the present invention.

A further modification is shown in FIG. 33. Here the first set of rolls 34, 36 corresponds with the similar rolls employed in FIGS. 25 and 26. They are, however, mounted to receive the web 20a after discharge from the roll 42 as in the embodiment of FIG. 32. These rolls are belt-driven in the same manner as in FIG. 32 so that their peripheral speed bears a ratio of about 1.5 to 1.0 as compared with the peripheral speed of the takeoff wheels 53, thus stretching the transverse corrugations to the desired angle. The rolls 34, 36 are followed by squeeze rolls 240, 241 and 242, 243. Optionally, of course, the rolls 34, 36 may be followed by one or more pairs of more finely divided, circumferentially grooved rolls 35, 37 as shown in FIGS. 25 and 26.

Examples, but not by way of limitation, of advantageous uses which may be made of the apparatus and method of the invention include: producing controlled elasticity in one or both directions of various sheet materials; increasing softness or pliability of sheet material; for example disposable diaper material and leather; increasing absorbency of toweling; increasing the efficiency of various filter materials; creping some sheets without the necessity of conditioning for plasticity or the use of adherents for adhering to the conventional creping cylinder; simultaneous creping of multiple sheets such as multiwall bagging and electrical insulation; creping of certain difficult sheet materials, such as metallic foils, wire cloth and plastic films, incapable of or extremely difficult to crepe by conventional methods; providing sheet materials with desired surface characteristics both functional and decorative; rearrangement of fibers and components of fibrous webs such as bats of wool or cotton as, for example, to equalize tensile strength in both directions and stabilizing the same; modifying the physical characteristics of woven and non-woven fabrics, for example, softening and stabilizing and improving the drape or other desired qualities, including relaxation of internal strains; creping at substantially higher speeds than possible by conventional methods; imparting elasticity in the cross direction to webs such as paper which ordinarily have the least tensile strength widthwise; imparting unusually high degrees of stretch to materials for use in wrapping and the like to facilitate molding around the objects to be wrapped.

While I have herein disclosed and described a presently preferred embodiment of the invention, it will nevertheless be understood that the same is susceptible of modifications and changes by those skilled in the art and therefore the invention is limited only by the proper scope to be afforded the appended claims.

I claim:

1. In a device for lengthwise condensing of a traveling web in which said web is pressed by means of a smooth grooved shoe against the surface of a main roll having a series of side-by-side ribs provided with frictional web-gripping surfaces and is discharged from said roll by a takeoff comb means intersecting said roll, the improvement which comprises providing a rotatable grooved backup pressing roll closely adjacent the leading edge of said shoe, said backup roll being provided with a series of alternating ribs and grooves, the backup roll serving to press said web at least partially into the grooves of said main roll, and rings of compressible material mounted in at least some of the grooves of said backup roll to press portions of said web against said web-gripping surfaces.

2. A device as claimed in claim 1 wherein the web-gripping surfaces of said ribs are provided by knurls having relatively planar sharply-angled converging surfaces against which said web is pressed by said rings but each knurl having a relatively smooth curved profile at the tip thereof.

3. A device for condensing a traveling web in the direction of its length comprising, in combination, a driven main roll provided with alternating circumferential ribs and grooves, said ribs having frictional web-gripping peripheral surfaces, mechanism for feeding said web onto said roll, mechanical pressing means arranged to press said web against said roll as it is carried forward by the latter, said pressing means including a pressing roll also provided with a series of alternating ribs and grooves, the latter serving to press said web at least partially into the grooves of said driven main roll, rings of resilient material mounted in at least some of the grooves of said pressing roll to press portions of said web against said web-gripping surfaces, and a takeoff comb means mounted so as to intersect said main roll and extend into said grooves at a location in closely spaced relation to the discharge edge of said pressing means.

4. A device for altering the degree of condensation of a traveling web in the direction of its length comprising, in combination, a driven main roll provided with alternating circumferential ribs and grooves, said ribs having frictional web-gripping peripheral surfaces, mechanism for feeding said web onto said roll, mechanical pressing means arranged to press said web against said roll as it is carried forward by the latter, said pressing means including a pressing roll also provided with a series of alternating ribs and grooves, the latter serving to press said web at least partially into the grooves of said driven main roll, rings of resillient material mounted in at least some of the grooves of said second roll to press portions of said web against said web-gripping surfaces, a rotatable takeoff comb mounted so as to intersect said main roll and extend into said grooves at a location in closely spaced relation to the discharge edge of said pressing means, and driving mechanism arranged to rotate said comb in the same direction as but at a different peripheral speed than said main roll to lift said web from said main roll and simultaneously alter its degree of condensation in the direction of its length.

5. In a device for altering the degree of condensation of a traveling web in the direction of its length wherein said web is pressed by means of a smooth grooved shoe against the surface of a main roll having a series of side-by-side ribs and is discharged from said roll by means of a takeoff comb means intersecting said roll, the improvement which comprises providing a rotatable grooved backup pressing roll closely adjacent the leading edge of said shoe, said backup roll being provided with a series of alternating ribs and grooves, the last-named ribs serving to press said web at least partially into the grooves of said roll, and mountings for said shoe and said backup roll arranged to permit pivoting said shoe toward and away from the surface of said first-named roll about the axis of said backup roll.

6. The combination as claimed in claim 5 wherein said mountings include mechanism for moving said shoe and backup roll in unison toward and away from said main roll.

7. In a device for condensing a traveling web a curved roll composed of a series of side-by-side rotatable members mounted on a bent axle, mechanism for directing said web onto said roll at one location and for leading said web from said roll at another location, and mechanism for pivoting the axle of said curved roll to change the locations at which said web impinges upon and departs therefrom.

8. In a device for condensing a traveling web having a second creping unit, a first creping unit adapted to longitudinally crepe said web prior to its introduction into said second creping unit, said first creping unit comprising a curved roll composed of a series of side-by-side rotatable members mounted on a bent axle, mechanism for directing said web onto the convex side of said roll and for leading said web from the concave side of said roll to said second creping unit, and an arm connected to said axle for pivoting said axle to change the locations at which said web impinges upon and departs therefrom.

9. The combination as claimed in claim 8 including at least one pair of intermeshing refining rolls through which said web passes after departure from said curved roll.

10. In a machine for lengthwise condensing of a traveling web in which said web is pressed by means of a smooth grooved shoe against the surface of a main roll having a series of side-by-side knurled ribs intermeshing with the grooves of said shoe and is discharged from said roll by means of a takoff comb means intersecting said roll, the improvement which comprises providing mounting mechanism for said shoe for varying the degree of its intermesh with said main roll at spaced locations therealong widthwise of the machine to compensate for flexing of said roll and said shoe.

11. In a machine for lengthwise condensing of a traveling web in which said web is pressed by means of a smooth grooved shoe against the surface of a main creping roll having a series of side-by-side ribs and is discharged from said roll by means of a takeoff comb means intersecting said roll, the improvement which comprises providing a rotatable grooved backup pressing roll closely adjacent the leading edge of said shoe, said back-up roll being provided with a series of alternating ribs and grooves, the backup roll serving to press said web at least partially into the grooves of said roll, and mountings for said shoe and said backup roll permitting adjustment of the same as a unit toward and away from said main creping roll and swinging of said shoe about the axis of said backup roll independently of said first-mentioned adjustment, said mountings including mechanism for varying the mutual spacing of said shoe and backup roll with respect to said main creping roll at spaced locations width-wise of the machine to compensate for flexing of said rolls and said shoe.

12. In a device for transversely creping a traveling web wherein said web is pressed against a driven main roll provided with alternating circumferential grooves and ribs and is lifted therefrom by a rotatable takeoff comb mounted so as to intersect said roll and extend into said grooves at a location in closely spaced relation to the discharge edge of said pressing means, the improvement which comprises contouring said rotatable takeoff comb to vary its radius at selected locations thereby producing variations in the character of crepe imparted to said web.

13. The combination as claimed in claim 12 wherein said takeoff comb comprises a series of side-by-side spaced discs, some of which are of different radii than others.

14. In a machine for lengthwise condensing of a traveling web in which said web is pressed by means of a shoe against the surface of a main creping roll having a series of side-by-side ribs and is discharged from said roll by means of a takeoff comb means intersecting said roll, the improvement which comprises providing a rotatable grooved backup pressing roll closely adjacent the leading edge of said shoe, said backup roll being provided with a series of alternating ribs and grooves, the backup roll serving to press said web at least partially into the grooves of said creping roll, and means for driving said backup roll at the same peripheral speed as said main creping roll.

15. The combination as claimed in claim 14 wherein said means for driving said backup roll comprises rings carried by said backup roll in running engagement with portions of said main creping roll.

16. In a device for transversely creping a traveling web in which said web is pressed by means of a smooth grooved shoe against the surface of a main roll having a series of side-by-side ribs provided with frictional web-gripping surfaces and is discharged from said roll by a takeoff comb means intersecting said roll, the improvement which comprises providing a rotatable grooved backup roll closely adjacent the leading edge of said shoe, said backup roll being provided with a series of alternating ribs and grooves, the backup roll serving to press said web at least partially into the grooves of said main roll, and means preceding said backup pressing roll adapted to gather said web widthwise into at least temporary longitudinal flutes corresponding to the ribs and grooves of said backup pressing roll and said shoe.

References Cited by the Examiner

UNITED STATES PATENTS

| 829,805 | 8/1906 | Sackville | 26—63 |
|---|---|---|---|
| 2,097,885 | 11/1937 | Koppe | 18—1 |
| 2,130,007 | 9/1938 | Haas | 156—341 |
| 2,196,006 | 4/1940 | Benedict | 156—201 |
| 2,567,967 | 9/1951 | Rowe | 254—283 |
| 2,624,245 | 1/1953 | Cluett | 154—33.05 |
| 2,626,422 | 1/1953 | Lammertse | 26—63 XR |
| 2,633,430 | 3/1953 | Kellgren et al. | 154—33.05 |
| 2,915,109 | 12/1959 | Walton | 156—59 |
| 2,938,568 | 5/1960 | Cock | 154—30 |
| 2,949,954 | 8/1960 | Wikle | 154—30 |
| 3,069,721 | 12/1962 | Arni et al. | 18—1 |

FOREIGN PATENTS

| 428,862 | 9/1911 | France. |
|---|---|---|

WILLIAM J. STEPHENSON, *Primary Examiner.*

CARL F. KRAFFT, EARL M. BERGERT, ALEXANDER H. BRODMERKEL, *Examiners.*